United States Patent
Cooper

(10) Patent No.: US 10,968,769 B2
(45) Date of Patent: Apr. 6, 2021

(54) METHOD AND SYSTEM FOR CALIBRATING AN ENGINE CORE BY DETERMINING POWER RATING DATA OF THE ENGINE CORE

(71) Applicant: ROLLS-ROYCE plc, London (GB)

(72) Inventor: Joseph B Cooper, Bristol (GB)

(73) Assignee: ROLLS-ROYCE plc, London (GB)

( * ) Notice: Subject to any disclaimer, the term of this patent is extended or adjusted under 35 U.S.C. 154(b) by 129 days.

(21) Appl. No.: 16/411,286

(22) Filed: May 14, 2019

(65) Prior Publication Data
US 2020/0141266 A1 May 7, 2020

(30) Foreign Application Priority Data
Nov. 2, 2018 (GB) ................................. 1817933

(51) Int. Cl.
*G01M 15/14* (2006.01)
*F01D 21/00* (2006.01)

(52) U.S. Cl.
CPC ........... *F01D 21/003* (2013.01); *G01M 15/14* (2013.01); *F05D 2260/83* (2013.01); *F05D 2270/802* (2013.01)

(58) Field of Classification Search
CPC .................................................. G01M 15/14
USPC ..................................................... 73/112.01
See application file for complete search history.

(56) References Cited

U.S. PATENT DOCUMENTS

| 4,788,855 A * | 12/1988 | Laskody ................. G01L 5/133 73/112.04 |
| 2015/0134270 A1 | 5/2015 | Long et al. |
| 2015/0362405 A1 | 12/2015 | Bowler et al. |
| 2020/0141239 A1 * | 5/2020 | Cooper .................. F01D 5/005 |
| 2020/0141267 A1 * | 5/2020 | Wilson .................... G01L 5/133 |
| 2020/0141333 A1 * | 5/2020 | Renold-Smith ........... F02K 3/04 |
| 2020/0141358 A1 * | 5/2020 | Cooper .................... F02K 3/065 |

FOREIGN PATENT DOCUMENTS

FR 3 044 093 A1 5/2017

\* cited by examiner

*Primary Examiner* — Eric S. McCall
(74) *Attorney, Agent, or Firm* — Oliff PLC

(57) ABSTRACT

A method of calibrating an engine core of a gas turbine engine, wherein the engine core includes a turbine, combustion equipment, a compressor, and a core shaft connecting the turbine to the compressor, the core shaft arranged to drive a propulsive fan of the gas turbine engine, the method including: providing a resistance load on the core shaft, the resistance load arranged to replicate the load of a propulsive fan; driving the engine core; measuring a performance parameter or the engine core; measuring a thrust generated by the engine core; and determining power rating data of the engine core, providing a correlation between the performance parameter and the thrust.

20 Claims, 9 Drawing Sheets

METHOD AND SYSTEM FOR CALIBRATING AN ENGINE CORE BY DETERMINING POWER RATING DATA OF THE ENGINE CORE

TECHNICAL FIELD

The present disclosure relates to a method of calibrating an engine core, a method of operating a gas turbine engine and a calibration system.

BACKGROUND

Gas turbine aircraft engines comprise a propulsive fan arranged downstream of an air intake. The fan is surrounded by a fan case, and typically generates two separate airflows. A first airflow is received by a core of the engine, and a second airflow is received in a bypass duct. The core comprises one or more compressors, a combustor, and one or more turbines. The bypass duct is defined around the core.

In use, the core airflow is compressed by the compressors, mixed with fuel and combusted in the combustor. The combustion products are expanded through the turbine stages and exhausted through a core nozzle. The turbines drive the compressor stages and propulsive fan through one or more interconnecting shafts.

Typically, whilst some thrust is provided by the core nozzle, the majority of the thrust generated by the engine is provided by the propulsive fan, through the bypass duct. Propulsive efficiency of the gas turbine can be improved by increasing the bypass ratio (the ratio of the air mass flow through the bypass duct to the air mass flow through the core). The bypass ratio is related to the size of the fan which in turn is limited by the rotation speed of the fan, as a large fan rotating at high speed may experience unwanted distortion of the fan, and other effects.

If the fan is driven by a reduction gearbox, it can be driven at slower speeds than the shafts from the turbines. This enables the fan to be increased in size, facilitating an increase of the bypass duct ratio.

In flight, it is not possible to directly measure the thrust produced by a gas turbine engine. Therefore, prior to entering into service, gas turbine engines are calibrated to provide a correlation between a measurable parameter, such as rotation speed of one of the core shafts or torque on the core shafts, to a known thrust output. Based on this, the thrust being produced by an engine can be determined. Typically, engines are calibrated as a single component. Therefore, when part of the engine needs to be serviced, overhauled or replaced or repaired, the whole engine must be taken out of use, and transported back to a maintenance location.

SUMMARY

According to a first aspect there is provided a method of calibrating an engine core of a gas turbine engine, wherein the engine core comprises a turbine, combustion equipment, a compressor, and a core shaft connecting the turbine to the compressor, the core shaft arranged to drive a propulsive fan of the gas turbine engine, the method comprising: providing a resistance load on the core shaft, the resistance load arranged to replicate the load of a propulsive fan; driving the engine core; measuring a performance parameter of the engine core; measuring a thrust generated by the engine core; and determining power rating data of the engine core, providing a correlation between the performance parameter and the thrust.

Fans and fan cases may be manufactured to sufficient tolerances such that calibrating only the engine core allows the thrust generated by the whole engine to be determined accurately in use, thus allowing for efficient use of the engine. Since only the engine core is required to go through the calibration process, the calibration method (also known as passing off) does not require assembly of the whole engine, and so the calibration process is simplified. Furthermore, each engine core is able to be used in a predictable manner with any fan and fan case, rather than only being usable in a predicable manner with the fan and fan case it is calibrated with. This enables intermixing of engine modules (such as a core module, a fan module and a fan case module). It is also easier to deliver the fan, fan case and engine core if they are manufactured and calibrated separately.

The resistance load may comprise one or more generators. The method may comprise: operating the generators to generate power whilst driving the engine core. By using a generator as the load to calibrate the engine, at least part of the energy used during the calibration process can be recovered. The method may comprise storing the power generated in a battery or other energy storage device. Alternative, the power may be provided to an external power network, or for immediate use.

The resistance load or engine core may comprise a gearbox, arranged such that the resistance load is driven at constant speed as the rotational speed of the core shaft is varied. This allows different engines, which may have shafts rotating at different speeds, to be calibrated using the same method and apparatus whilst generating AC power at the same frequency.

The resistance load may comprise a variable resistance load. The method may comprise varying the resistance of the resistance load to simulate different flight conditions.

The performance parameter may be selected from a list comprising: a torque on the shaft; a rotational speed of the shaft.

Driving the engine core may comprise driving the engine core at a first rotational speed. The method may comprise: measuring the performance parameter and the thrust at the first rotational speed.

The method may comprise driving engine core at a plurality of rotational speeds; and measuring the performance parameter and thrust at different rotational speeds, such that the power rating data provides the thrust as a function of the performance parameter.

The method may comprise mounting the engine core on a test apparatus. The test apparatus may comprise a frame for supporting the engine core, and a base for supporting the frame. The frame may be coupled to the base by an interface arranged to allow relative displacement of the frame and base. Measuring a thrust generated by the engine core may comprise: measuring a force exerted between the frame and the base; and determining a thrust based on the force.

The test apparatus may comprise a sensor arrangement for measuring the performance parameter. Alternatively, the sensor arrangement may be comprised in the engine core.

According to a second aspect, there is provided a method of operating a gas turbine engine, the gas turbine engine comprising an engine core calibrated according to the method of any preceding claim, the method of operating the gas turbine engine comprising: combining the calibrated core with a fan and fan case; receiving a target thrust; setting an engine control parameter; measuring a thrust generated by the engine based on the power rating data and a measured engine performance parameter; determining if the measured thrust is equal to the target thrust; and controlling the engine control parameter based on the determining.

The method allows for an engine core to be used with any fan and fan case, allowing intermixing of different engine parts, whilst still enabling the thrust provided by the engine to be calculated accurately, enabling efficient use of the engine.

According to a third aspect, there is provided a calibration system arranged to calibrate an engine core of a gas turbine engine, wherein the engine core comprises a turbine, combustion equipment, a compressor, and a core shaft connecting the turbine to the compressor, the core shaft arranged to drive a propulsive fan of the gas turbine engine, the system comprising: a frame for mounting the engine core; a base for supporting the frame, the frame mounted from the base by an interface arranged to allow relative displacement of the frame and base; a sensor arrangement arranged to measure a force exerted between the frame and the base; and a resistance load arranged to be coupled to the core shaft of the engine, the resistance load arranged to replicate the load of a propulsive fan.

Fans and fan cases may be manufactured to sufficient tolerances such that calibrating only the engine core allows the thrust generated by the whole engine to be determined accurately in use, thus allowing for efficient use of the engine. Since only the engine core is required to go through the calibration process, the system does not require assembly of the whole engine, and so the calibration process is simplified. Furthermore, each engine core is able to be used in a predictable manner with any fan and fan case, rather than only being usable in a predicable manner with the fan and fan case it is calibrated with. This enables intermixing of engine modules (such as a core module, a fan module and a fan case module). It is also easier to deliver the fan, fan case and engine core if they are manufactured and calibrated separately.

The system may further comprise a second sensor arrangement, arranged to measure a performance parameter of the engine core. The second sensor may be comprised within the engine core.

The resistance load may comprise one or more generators arranged to generate power. The system may further comprise a storage device arranged to store the power generated by the one or more generators. The resistance load or engine core may comprise a gearbox, arranged such that the resistance load is driven at constant speed as the rotational speed of the core shaft is varied. The resistance load may comprise a variable resistance load.

The system may be arranged to calibrate an engine core without a propulsive fan or fan case attached to the engine core.

According to a further aspect there is provided a method of calibrating a gas turbine engine having a propulsive fan and an engine core, the method comprising: measuring a total thrust generated by the engine; measuring the thrust generated by the engine core; measuring first and second engine performance parameters; based on the total thrust and engine core thrust, determining a thrust generated by the propulsive fan; providing a first power setting parameter associating the fan thrust with the first engine performance parameter; and providing a second power setting parameter associating the engine core thrust with the second engine performance parameter.

Measuring the engine core thrust may comprise: measuring a temperature and pressure at an entry of a core nozzle; and determining the engine core thrust generated based on the measured temperature and pressure.

The temperature and pressure may be measured by a test rig comprising the core nozzle. The core nozzle, referred to as a slave nozzle, has calibrated characteristics, allowing the core thrust to be determined from the measured parameters. The slave nozzle is part of the test rig, and is not part of the delivered engine. The slave nozzle can be used for calibrating many engines.

The test rig may further comprise: a nacelle arranged to receive the engine core and the propulsive fan. The nacelle may at least partially define a bypass duct around the engine core. The nacelle is also a slave component.

The test rig may be arranged to support the gas turbine engine, and may comprise load cells for measuring the total thrust generated by the engine.

Measuring the total thrust and engine core thrust may comprise: operating the engine at an output level; allowing the operation of the engine to stabilise; determining the first and second power setting parameter at the output level; and changing the output level and repeating the steps of allowing the operation of the engine to stabilise and determining the first and second power setting parameter at the output level.

The method may comprise outputting the first power setting parameter to a first data card associated with the fan; and outputting the second power setting parameter to a second data card associated with the engine core. The first and second data cards may be arranged to be coupled to an engine control unit of the assembled engine.

The use of data cards holding the power setting parameters enables the intermixing of engine components. Each core and fan has its own data card. By coupling the data card associated with a particular component to the engine control unit, the correct power setting parameter may be provided to the engine.

According to a further aspect, there is provided a method of calibrating an engine core and a fan of a gas turbine engine, the method comprising: measuring the total thrust generated by the engine; measuring the air flow through a nozzle coupled to the engine core, to determine the thrust generated by the core only; and determining the thrust generated by the fan based on the total thrust and the engine core thrust.

The engine core may comprise a turbine, a compressor, a core shaft connecting the turbine to the compressor, and a gearbox that receives an input from the core shaft and outputs drive to the fan so as to drive the fan at a lower rotational speed than the core shaft. The fan comprises a plurality of fan blades.

According to a further aspect, there is provided an apparatus for measuring the thrust generated by an engine core of a gas turbine engine, the apparatus comprising: a nozzle arranged to attach to an exhaust end of an engine core; a pressure sensor in the nozzle arranged to measure the total pressure at an entry to the nozzle; and a temperature sensor in the nozzle arranged to measure the temperature at an entry to the nozzle, wherein the nozzle comprises a slave nozzle having a calibrated flow function characteristic.

The apparatus may further comprise a nacelle arranged to receive the engine core and propulsive fan, wherein the nacelle at least partially defines a bypass duct around the engine core; supports for mounting the nacelle; and load cells coupled to the supports to measure the total thrust generated by the engine.

In any of the above aspects, the first power setting parameter may correlate the first engine performance parameter to the fan thrust for a range of values of the first engine performance parameter.

In any of the above aspects, the first engine performance parameter may comprise a parameter selected from: rotational speed of a shaft driven by a turbine of the engine core, and arranged to drive rotation of the fan directly; rotational speed of a shaft driven by a turbine of the engine core, and arranged to drive rotation of the fan through a gearbox; rotational speed of a shaft driven by a turbine of the engine core, and arranged to drive a compressor of the engine core; an air pressure in the bypass duct; or a torque measurement of the fan.

In any of the above aspects, the second engine performance parameter may comprise a parameter selected from: an air pressure or temperature at the entry or exit of the engine core; an air pressure or temperature at the entry or exit of the engine core as a function of one or more of altitude, speed/Mach number; or the ambient temperature in the form of the difference from the International Standard Atmosphere (ISA) temperature (DTAMB) as defined in international standard ISO 2533:1975, or a measurement of an air pressure or temperature at any stage of the engine core, alone or in combination.

In any of the above aspects, the second power setting parameter may correlate the second engine performance parameter to the engine core thrust for a range of values of the second engine performance parameter.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8 A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 029, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1}))^2$. The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Figure 1:
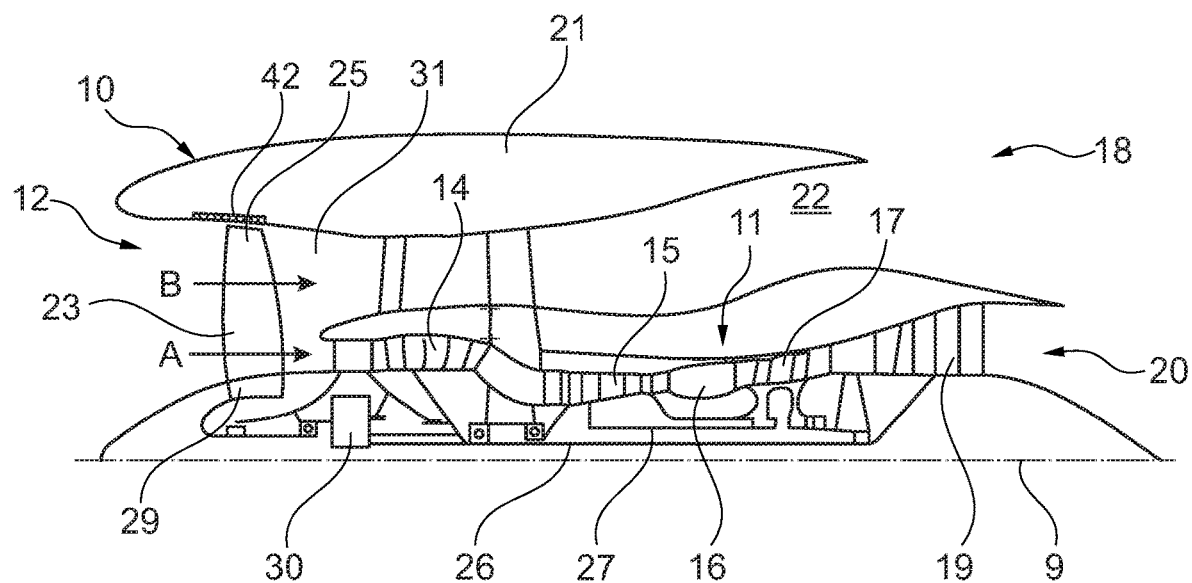
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. The fan 23 is attached to and driven by the low pressure turbine 19 via a shaft 26 and an epicyclic gearbox 30.

The propulsive fan 23 includes a plurality of fan blades 25 extending radially outward from a hub 29 mounted on an output shaft of the gearbox 30. The radially outer tips of the fan blades 25 are surrounded by a fan casing 42, which extends downstream behind the fan 23. The fan casing 42 will be discussed in more detail below, in relation to FIGS. 4A and 4B. Behind the fan casing 42, in the axial flow direction (downstream), a nacelle 21 surrounds the engine core 11. The fan casing 42 and nacelle 21 define a bypass duct 22 and a bypass exhaust nozzle 18 around the engine core 11.

The bypass airflow B flows through the bypass duct 22. At an upstream end of the bypass duct 22, adjacent an intake 31 of the bypass duct 22, and downstream of the fan 23, a plurality of outlet guide vanes 33 extend radially between the engine core 11 and the fan casing 42. The outlet guide vanes 33 reduce swirl and turbulence in the bypass airflow B, providing improved thrust.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
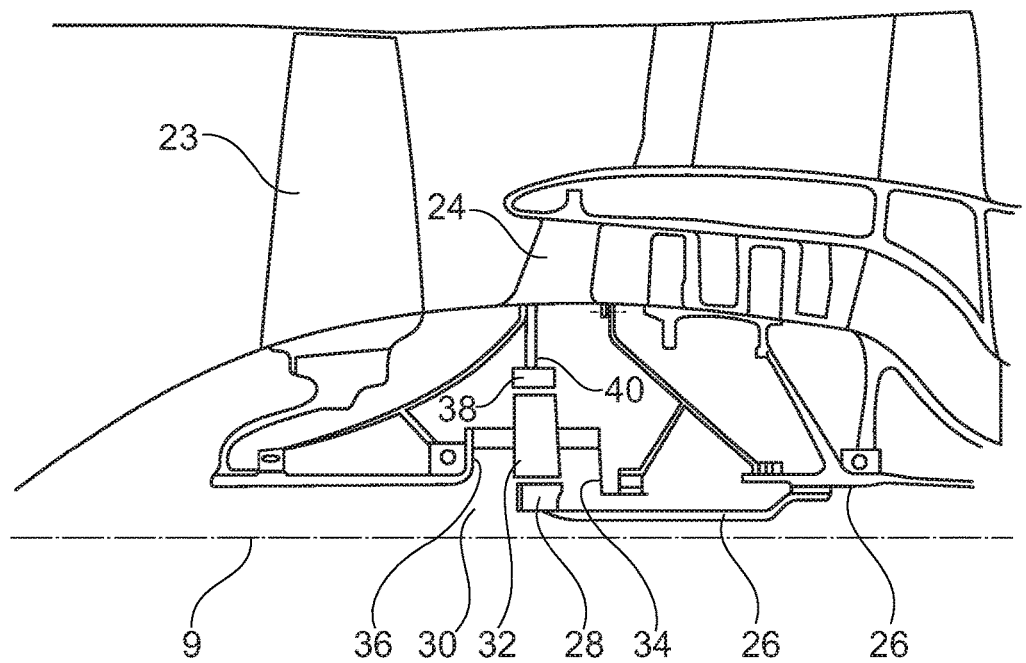
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
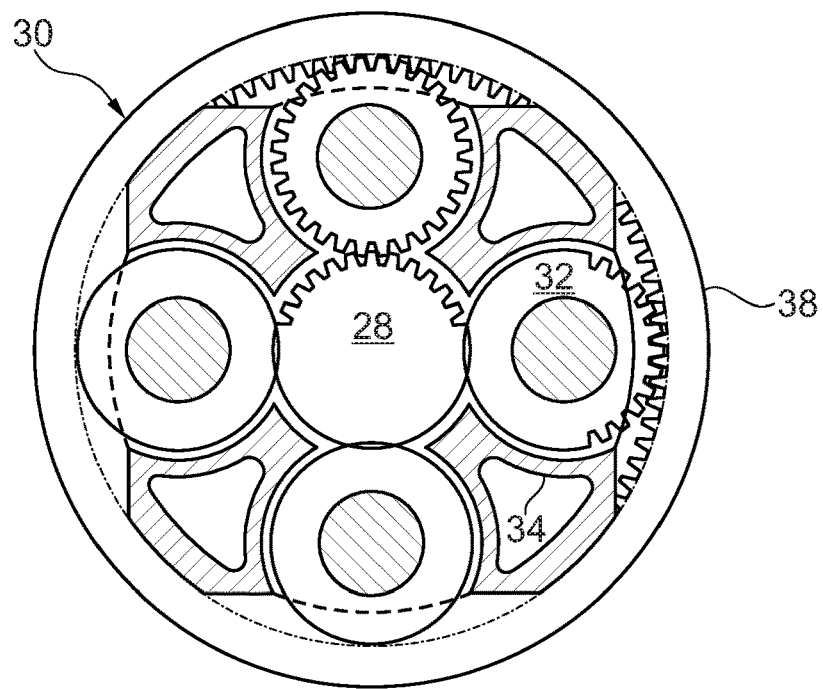
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. The gas turbine engine 10 may also be arranged in the "pusher" configuration, in which the fan 23 is located downstream of the core 11. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4A:
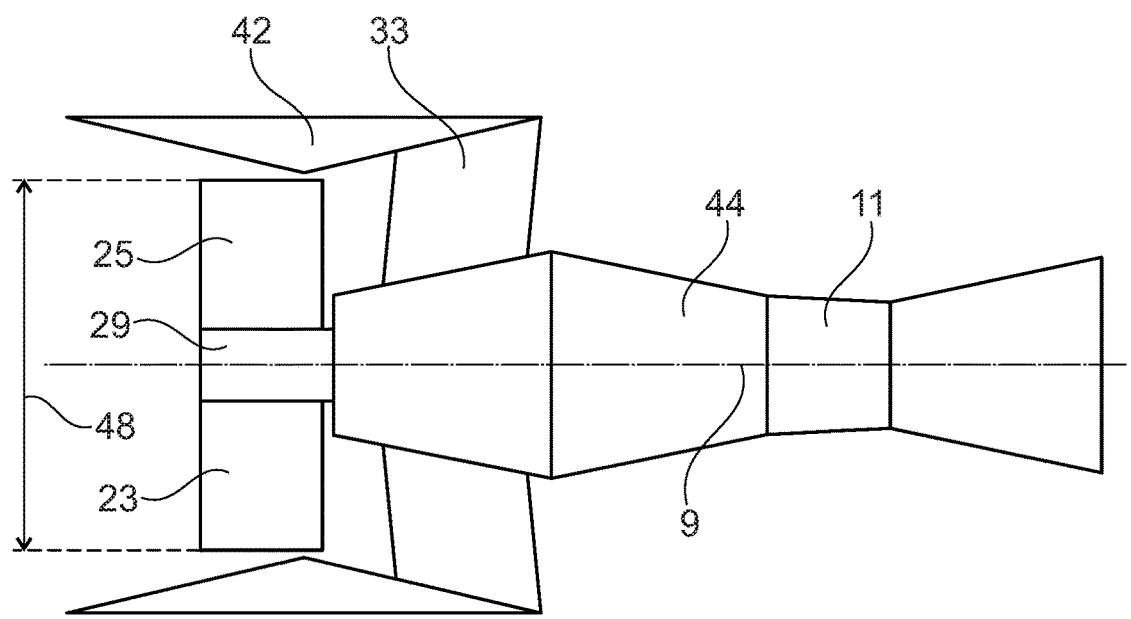
FIG. 4A illustrates a schematic view of the gas turbine engine of FIG. 1, illustrating the separate modules of the engine.
Figure 4B:
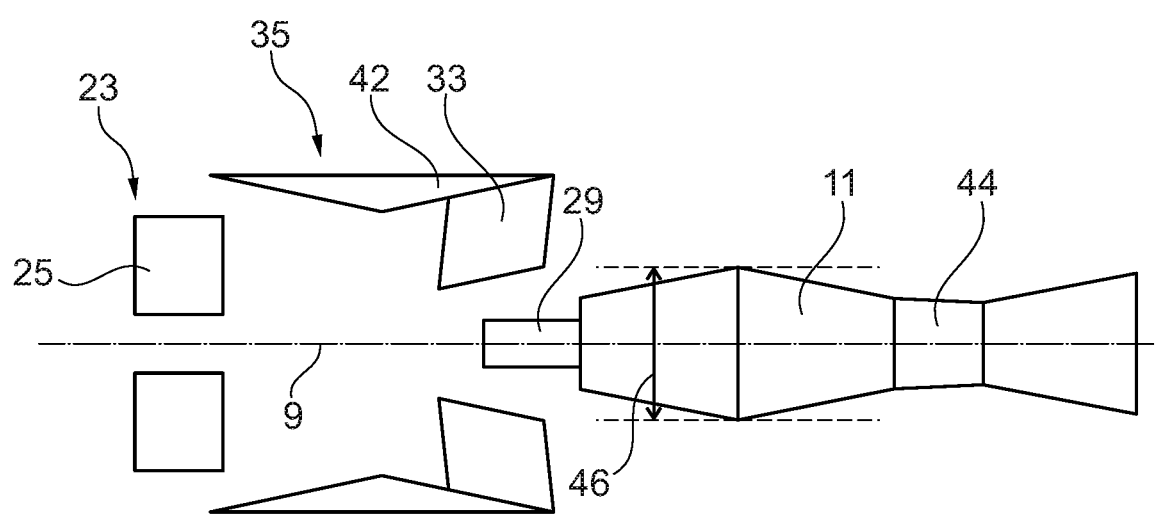
FIG. 4B illustrates the modules of FIG. 4A, in exploded form.

FIG. 4A schematically illustrates the constituent components of the gas turbine engine 10 of FIGS. 1 to 3, with the nacelle 21 removed. As shown in FIG. 4B, the gas turbine engine 10 is formed of a number of separate modules 11, 23, 35. The engine 10 may thus be considered modular.

The first module is an engine core module 11. This typically includes the gearbox 30, low pressure compressor 14, high-pressure compressor 15, combustion equipment 16, high-pressure turbine 17, and low pressure turbine 19, The engine core module 11 can also be referred to as a propulsor. The second module, also referred to as the fan module 23, includes the fan blades 25. The third module 35 includes the fan case 42.

The outlet guide vanes 33 extend inwardly from the fan case 42, and typically form part of the fan case module 35. The hub 29 and gearbox 30 may be part of the fan module 23 or the engine core module 11. The gearbox 30 may additionally be configured as a separable module in its own right or part of the fan case module 35.

As shown in FIG. 4B, the fan module 35 can be removed from the engine core module 11, and the engine core module 11 and fan case module 35 can be separated from one another. This facilitates easy delivery and transport of the engine 10, as the separate modules 11, 23 35. Any suitable connections may be used to join the modules. For example, the fan case module 35 may be bolted to the engine core 11 by bolted connections at the radially inner ends of the outlet guide vanes 33. Further connecting/support struts may also be provided between the fan case 42 and the engine core 11.

The modules 11, 23, 35 may be interchangeable, such that, for example, a gas turbine engine 10 that includes a first engine core module 11, a first fan module 23 and a first fan case module 35 may have the first engine core module 11 removed, and replaced with a second engine core module 11 having the same design. The second engine core module 11 may have the same design at least with respect to the interfaces between the modules.

The modules 11, 23, 35 may be interchangeable, such that, for example, the engine core module 11 of a gas turbine engine 10, may be replaced with a second, different, engine core module 11. The second engine core module 11 has the same design parameters (or sufficiently similar) so that it is compatible with the fan module 23 and fan case module 42. It will be appreciated that any one or more of the modules 11, 23, 35 may be interchanged with compatible alternatives in this way.

An operator of a fleet of aircraft or engines 10 may have a plurality of engine core modules 11, a plurality of fan modules 23 and a plurality of fan case modules 35. Each engine 10 may include any one of each of the modules 11, 23, 35 and still operated accurately and efficiently, rather than each engine 10 comprising dedicated sets of modules 11, 23, 35 that can only be used together for efficient use (i.e. the first engine core module 11 only works with the first fan module 23 and the first fan case module 35, the second engine core module 11 only works with the second fan module 23 and the second fan case module 35, and the like). The interchangeability of modules allows the first engine core module 11 to be serviced, replaced or repaired, whilst aircraft using the engines 10 remain functional. Otherwise, an aircraft would have to be taken out of service for the engines 10 to be serviced.

The engine core module 11 is smaller than the fan case module 35, and also requires more regular maintenance. Therefore, by using a modular engine 10 with interchangeable modules, the smaller, easier to transport parts (such as the core module 11 and fan blades 25), can be shipped, whilst the larger parts (such as the nacelle 21 and fan case module 35), which are harder to transport, are kept with the aircraft.

In flight, it is not possible to measure the thrust generated by an engine 10 directly. When an engine 10 is manufactured, overhauled or serviced, it is calibrated to determine a correlation between one or more engine performance parameters that can be measured in flight, and the thrust. Thus, during operation, the measurable engine performance parameter is monitored, and the thrust output accurately determined, based on the calibration. This correlation can be considered to be an engine power rating or power setting parameter.

During use of the engine 10, a desired thrust is compared to the measured thrust (determined by the power rating). The operation of the engine 10 is then controlled by variation of an engine control parameter.

In one example, the measureable engine performance parameter may be, for example, the rotational speed or angular velocity of the core shaft 26 driving the gearbox 30, and the control parameter may be the rate at which fuel is delivered to the combustion equipment 16.

The thrust generated by an engine 10 has two main contributions; the air flow A through the engine core 11, and the air flow B through the bypass 22. Typically the air flow B through the bypass provides 90% to 95% of the total thrust. The thrust through air flow B is generated by the fan 23, which is turn is driven by the engine core 11. The fan 23 and fan case 42 may be manufactured to a high degree of tolerance, such that the behaviour of the fan 23 and fan case 42 can be accurately known. Therefore, only the engine core 11 requires calibration.

Since only the engine core 11 is calibrated, there is no requirement to assemble a complete engine 10 for the calibration process. This makes the calibration process more efficient, and easier to complete. Furthermore, since the contribution from the fan 23 and fan case 42 is based on the manufacturing parameters, the engine core 11 may be used with any fan 23 and fan case 42 of appropriate design.

Figure 5A:
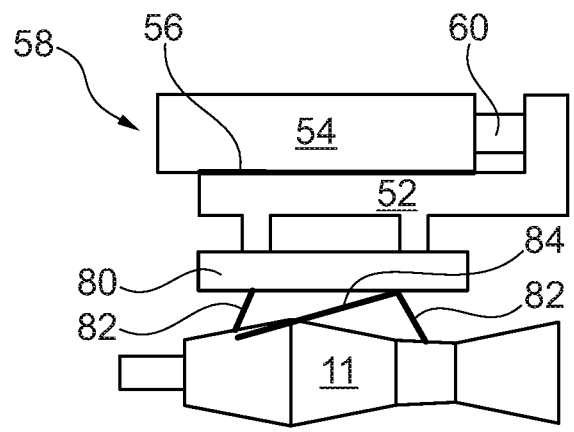
FIG. 5A illustrates a test apparatus for mounting an engine core.
Figure 5B:
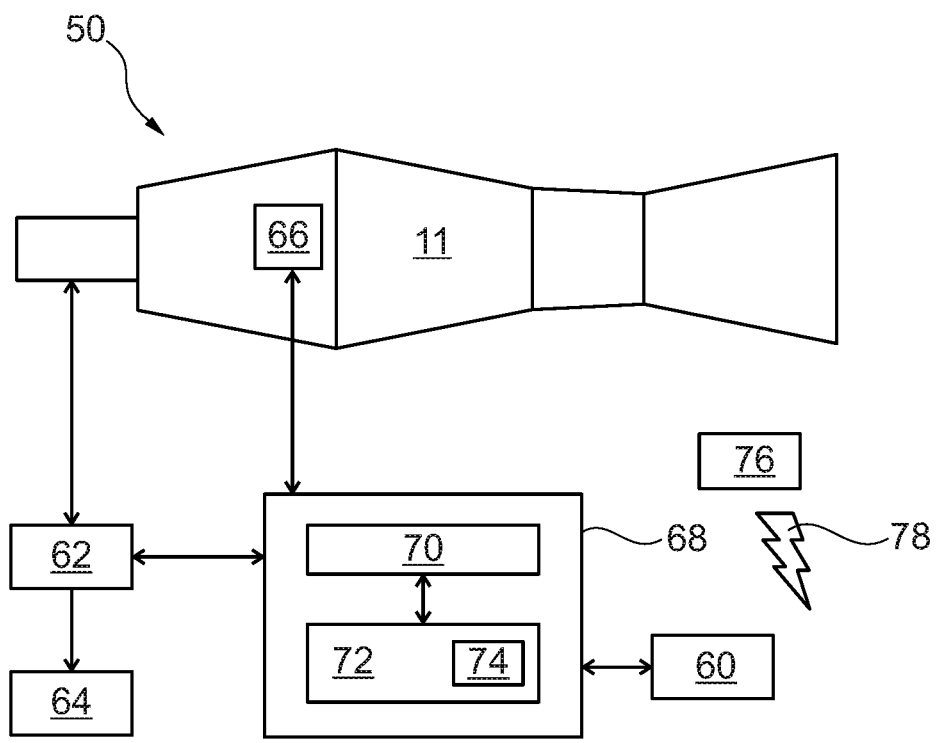
FIG. 5B illustrates a system for calibrating the engine core, mounted in the apparatus of FIG. 5A.
Figure 6:
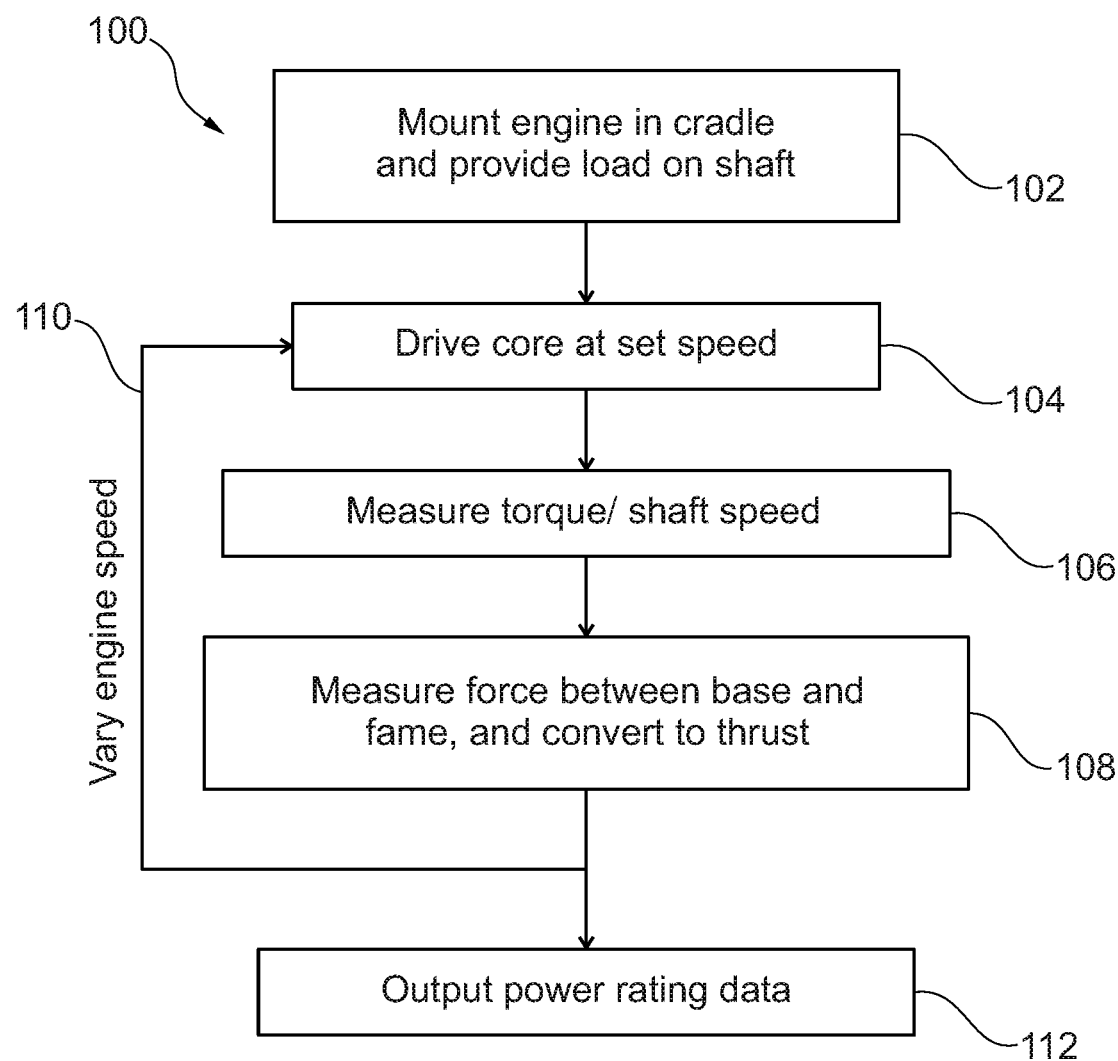
FIG. 6 illustrates a first example of a method for calibrating an engine core.

A method 100 of calibrating an engine core 11 will be discussed in relation to FIGS. 5A, 5B, and FIG. 6. FIGS. 5A and 5B illustrates a system 50 for calibrating an engine core 11, whilst FIG. 6 illustrates the steps of the method 100 of calibrating the engine core 11. The system 50 includes a test apparatus 58 for mounting the engine core 11. FIG. 5A illustrates the test apparatus 58 whilst FIG. 5B illustrates the other components of the system 50.

In normal use, an engine core 11 is fitted within a fan case 42 and nacelle 21, and then mounted from an aircraft by an engine pylon. Engine mounts and thrust links may extend directly from the pylon to the engine core 11, through the fan case 42 and nacelle 21. In the test apparatus 58, the engine core 11 is suspended from a test pylon 80 using engine mounts 82 and thrust links 84 in the same way. The test pylon 80 is secured to a thrust cradle or frame 52. The frame 52 is then mounted to a stationary base 54.

The frame 52 is mounted from the base by a sliding interface 56, including one or more sliding joints, such that the frame 52 can slide relative to the base 54 along the axial direction of the engine core 11. A retaining link, in the form of a load cell or strain gauge 60 is provided between the frame 52 and base 54.

The system 50 for calibrating the core engine 11 includes a mechanical resistance load 62 that is mounted on the fan shaft 26 of the engine core 11. The mechanical load 62 replicates the fan 23 being spun during the calibration process 100. In one example, the load 62 may be a generator arranged to generate electrical power using the torque from the shaft 26.

A second sensor arrangement 66 is also provided, to monitor one or more engine performance parameters of the engine core 11. This may include, for example, one or more of: a sensor to detect the rotational speed (angular velocity) of one or more of the core shafts 26, 27 of the engine core 11, a torque sensor to measure the torque applied to one or more of the core shafts 26, 27 of the engine core 11, pressure sensors to detect air pressure at various points through the engine core 11, and temperature sensors to detect air pressure at various points through the engine core 11.

The second sensor arrangement 66 may be part of the test apparatus 58. Alternatively, the system 50 may make use of sensors 66 provided within the engine core 11, that are separate from the system 50.

The system 50 also includes a controller 68. The controller 68, the load 62, the load cell or strain gauge 60, and the sensor arrangement 66 may be coupled to one another via a wireless link and may comprise transceiver circuitry and one or more antennas. Additionally or alternatively, the controller 68, the load 62, the load cell or strain gauge 60 and the sensor arrangement 66 may be coupled to one another via a wired link and may comprise connectors (such as a Universal Serial Bus (USB) socket). It should be appreciated that the controller 68, the load 62, the load cell or strain gauge 60 and the sensor arrangement 66 may be coupled to one another via any combination of wired and wireless links.

Figure 7A:
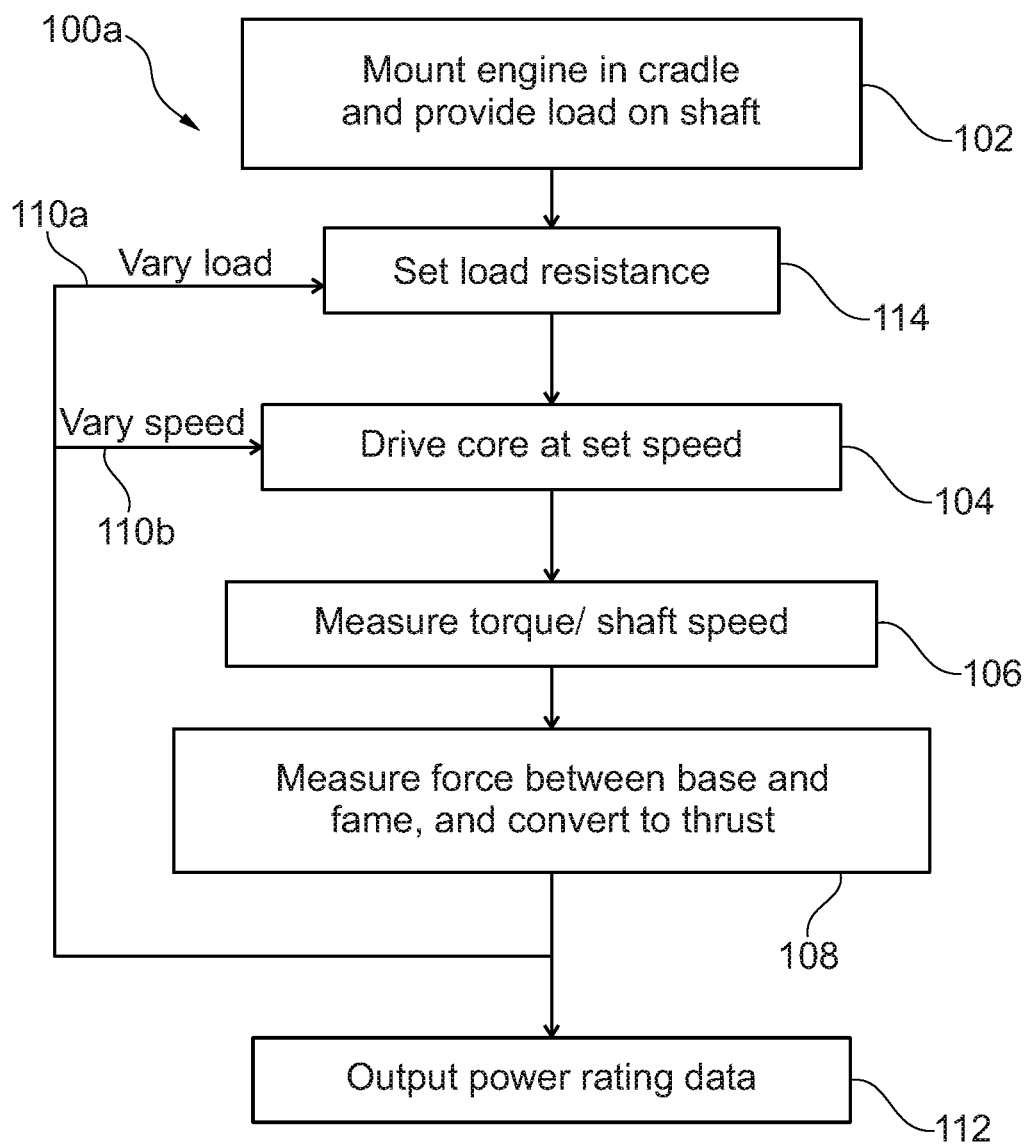
FIG. 7A illustrates a second example of a method for calibrating an engine core.
Figure 7B:
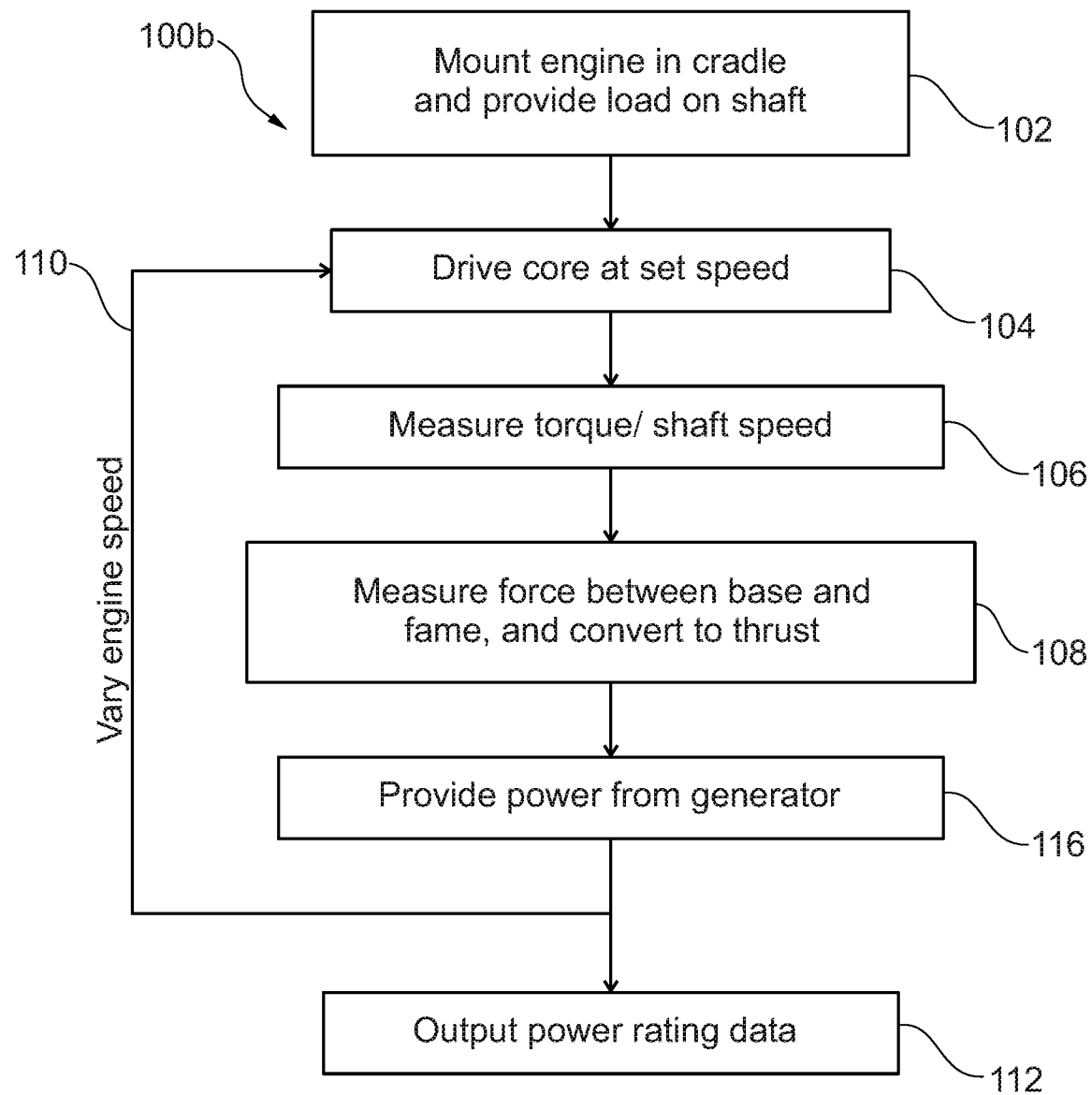
FIG. 7B illustrates a third example of a method for calibrating an engine core.

The controller 68 may comprise any suitable circuitry to cause performance of the methods 100 described herein and as illustrated in FIGS. 6, 7A, and 7B. The controller 68 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods. In some examples, the controller 68 may be a Full Authority Digital Engine Controller (FADEC), an electronic engine controller (EEC) or an engine control unit (ECU).

In various examples, the controller 68 may comprise at least one processor 70 and at least one memory 72. The memory 72 stores a computer program 74 comprising computer readable instructions that, when read by the processor 70, causes performance of the methods described herein, and as illustrated in FIGS. 6, 7A, and 7B. The computer program 74 may be software or firmware, or may be a combination of software and firmware.

The processor 70 may be located on the engine core 11, or may be located remote from the engine core 11, or may be distributed between the engine core 11 and a location remote from the engine core 11. The processor 70 may include at least one microprocessor and may comprise a single core processor, may comprise multiple processor cores (such as a dual core processor or a quad core processor), or may comprise a plurality of processors (at least one of which may comprise multiple processor cores).

The memory 72 may be located on the engine core 11, or may be located remote from the engine core 11, or may be distributed between the engine core 11 and a location remote from the engine core 11. The memory 72 may be any suitable non-transitory computer readable storage medium, data storage device or devices, and may comprise a hard disk and/or solid state memory (such as flash memory). The memory 66 may be permanent non-removable memory, or may be removable memory (such as a universal serial bus (USB) flash drive or a secure digital card). The memory 66 may include: local memory employed during actual execution of the computer program; bulk storage; and cache memories which provide temporary storage of at least some computer readable or computer usable program code to reduce the number of times code may be retrieved from bulk storage during execution of the code.

The computer program 74 may be stored on a non-transitory computer readable storage medium 76. The computer program 74 may be transferred from the non-transitory computer readable storage medium 76 to the memory 72. The non-transitory computer readable storage medium 76 may be, for example, a USB flash drive, a secure digital (SD) card, an optical disk (such as a compact disc (CD), a digital versatile disc (DVD) or a Blu-ray disc). In some examples, the computer program 74 may be transferred to the memory 72 via a signal 78 (such as a wireless signal or a wired signal).

Input/output devices may be coupled to the controller 68 either directly or through intervening input/output controllers. Various communication adaptors may also be coupled to the controller 68 to enable the system 50 to become coupled to other apparatus or remote printers or storage devices through intervening private or public networks. Non-limiting examples include modems and network adaptors of such communication adaptors.

At a first block 102 of the method 100, the engine core 11 is mounted in the test apparatus 58 and the load 62 is provided on the shaft 26 of the engine core 11. At a second block 104, the engine core 11 is then operated to drive the engine core 11 at a nominal speed. The nominal speed may be set by, for example, setting the engine control parameter to a first value.

Operation of the engine core 11 causes a force between the frame 52 and base 54 of the test apparatus, such that the frame 52 is urged to slide relative to the base 54. The retaining link 60 prevents that, and measures the force generated. The force increases with increased power output from the engine core 11. Prior calibration of the test apparatus 58 allows the force to be converted to a thrust measurement.

The calibration of the test apparatus 58 ensures the thrust is representative of a whole engine 10, including the fan 23 and fan case 42, rather than just the engine core 11. For example, the test apparatus 58 may be calibrated using a reference engine with a known relationship between the total thrust produced, and an engine performance parameter. The calibration of the test apparatus 58 uses the core 11 from the reference engine, and measures the force exerted between the frame 52 and base 54 as a function of the engine performance parameter, over a range of conditions. Thus, the calibration provides a relationship between the force and the total engine thrust.

After the operation of the engine core 11 has stabilised, the torque on the shaft 26 and/or the angular velocity of the shaft 26 is measured at block 106, and at block 108, the force on the retaining link 60 is measured, and the thrust determined.

At step 110, the set speed of the engine core 11 is altered. For example, the engine control parameter may be varied. The process of allowing the engine core 11 operation to stabilise, measuring the torque and/or angular velocity on the shaft 26 and determining the thrust from a measured force on the retaining link 60 is repeated. These steps are repeated for a variety of engine speeds, to provide a range of calibration data between the torque and/or shaft speed and the thrust. The completed set of data is then output, at block 112, as power rating data.

The power rating data may be stored in any memory associated with the engine core 11. For example, the power rating data may be stored in a memory provided on the core 11 (such as, but not limited to the memory 72 discussed above), or on a removable card or other carrier. Thus, when the engine core 11 is fitted to an aircraft, the power rating data may be communicated to an engine control system for use in operating the engine. The transmission may be by any suitable wired or wireless means, such as those discussed above.

FIGS. 7A and 7B illustrate alternative methods 100a,b for calibrating the engine core 11. The methods 100a,b illustrated in FIGS. 7A and 7B are similar to the method 100 illustrated in FIG. 6 and where the blocks are similar, the same reference numerals are used.

The method 100a illustrated in FIG. 7A differs from the method 100 illustrated in FIG. 6 in that whilst the method 100 in FIG. 6 includes a loop for varying the speed of the engine core 11, the method 100a in FIG. 7A also includes variation of the mechanical resistance provided by the load 62.

The load 62 is used to simulate the effect of the fan 23. However, the load of the fan 23 may vary in different flight conditions. For example, the fan 23 spins faster during take-off to produce more thrust and so the fan 23 is more highly loaded than at cruise. The time taken for the engine core 11 to accelerate its angular velocity from idle speed to take-off speed can be tested during the calibration process 100, 100a, 100b. The change in loading may simulated by using a variable load. Thus the method also includes a step 114 of setting the resistance provided by the load 62.

Where variation of the load 62 is required, the method 100a may revert to block 114 to set a new resistance of the load, rather than reverting to step 104, where the engine speed is increased. This is via step 110a.

Where no variation of the resistance provided by the load 62 is required, the method 100a may revert to block 104a, by step 110b. This is the same as in FIG. 6.

It will be appreciated that the resistance provided by the load 62 and the engine speed may be varied simultaneously to fully simulate different engine conditions. Alternatively, different power rating data, each providing the thrust as a function of the engine performance parameter, may be determined for a variety of different fixed loads. As a further alternative, different power rating data, each providing the thrust as a function of the load, may be determined for a variety of different engine speeds.

Where the load 62 is provided by a generator, as discussed above, a variable load could be provided by using several blocks of generators which can be turned on and off, dependent on how much resistance is required. Additional generators are engaged to increase the resistance on the shaft 26.

The variable load 62 may also be useful to provide different power rating data corresponding to different designs of fan 23. Thus the engine core 11 may be used with a variety of different fans 23. Each set of power setting data may be associated with an identifier of the fan type. Thus, when the engine core 11 is assembled with a fan 23 and installed on an aircraft, the correct power setting data may be used. The correct power setting data may be selected manually, by a user, may be selected automatically, based on an identifier associated with the fan 23, or may be detected.

The method 100b illustrated in FIG. 7B differs from the method 100 illustrated in FIG. 6 in that it includes, at block 116, providing the power generated by the load 62 (which is a generator) for a further use.

In one example, the generated electricity can be stored in on-site batteries 64 for later use. Alternatively, the generated electricity may be or supplied to an external organisation (for example an electricity grid or electricity supplier) or to a local area grid community (local businesses and residents). A further alternative is for the generated electricity to be used directly by the calibration system 50, during the calibration process 100.

It will be appreciated that the speed of the core shafts 26, 27, may vary during the calibration process. Furthermore, different engine cores 11 may spin at different speeds. However, in order to efficiently generate power, the generator should rotate at a substantially constant speed. In order to achieve this, a gearbox may be provided. This can either be the gearbox 30 of the engine core 11, or a gearbox (not shown) associated with the load 62. Where the gearbox is associated with the load, the gearbox 30 may be omitted form the engine core 11, during calibration. The system 50 may also include an actuator (not shown) to control the gearbox.

It will be appreciated that the methods 100*a*,*b* discussed in FIGS. 7A and 7B are not mutually exclusive. Therefore, the steps discussed in relation to FIG. 7A may be combined with the steps discussed in relation to FIG. 7B, such that a method includes both varying the resistance provided by the load 62, and providing the electricity generated by the load 62.

Figure 8:
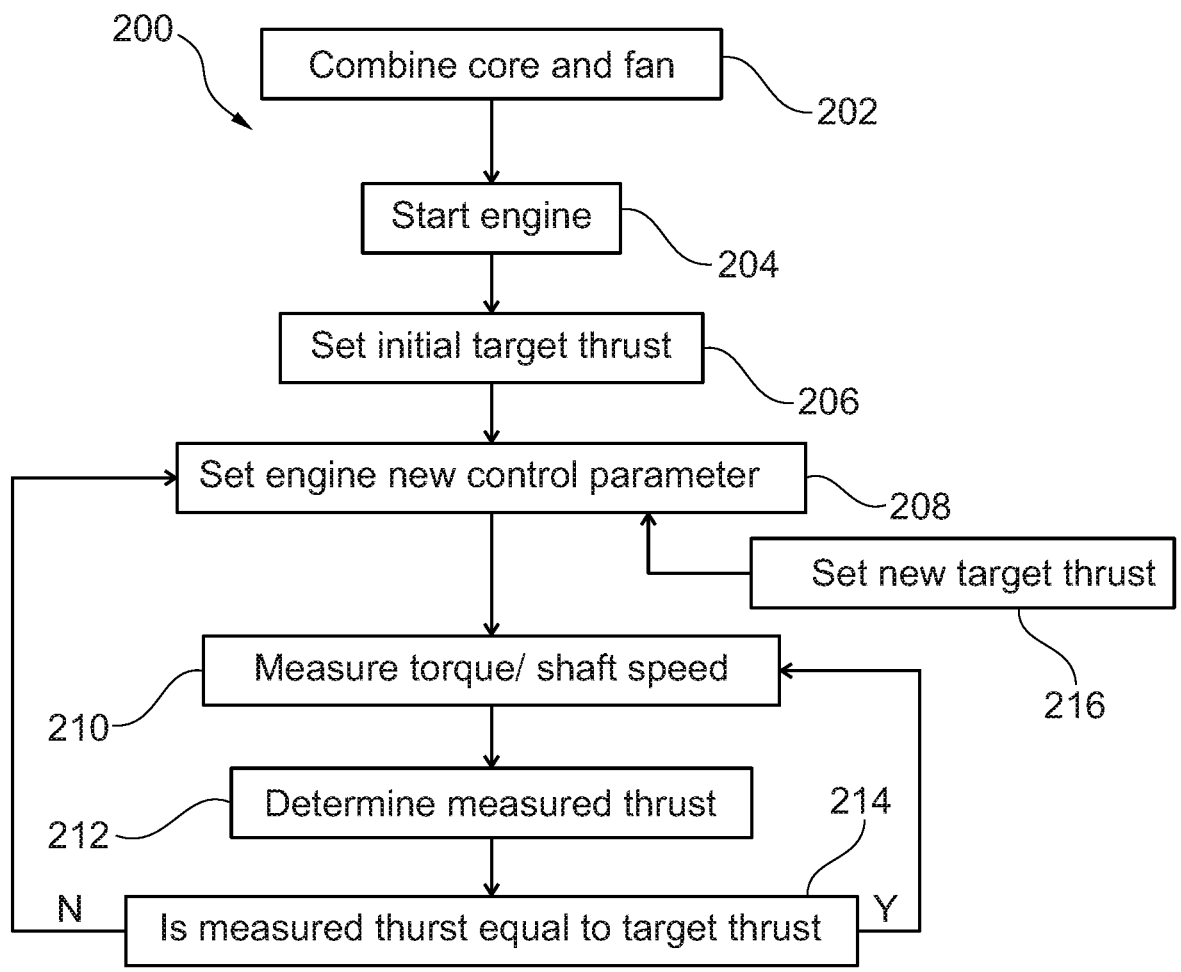
FIG. 8 illustrates an example of a method for operating a gas turbine engine calibrated according to the method of any of FIG. 6, 7A or 7B.

FIG. 8 illustrates an example method 200 for operating an engine 10 based on the power rating data obtained from the methods of FIG. 6, 7A or 7B.

At block 202, after the engine core 11 is calibrated, it is combined with a fan 23 and fan case module 35, and installed on an aircraft (not shown). Some time after that, the engine 10 is started at block 204.

After any start-up process, the engine 10 may idle for a period before an initial thrust is set at block 206. The initial thrust may be determined by a flight controller (see FIG. 9) or may be received via an input from a pilot through suitable control means.

At block 208, the engine control parameter is set based on the target thrust and known control data of the engine 10. The relevant engine performance parameter (for example shaft speed or torque) is measured at block 210, and then, at block 212 the thrust is determined using the engine performance parameter and the power rating data.

At block 214, it is checked whether the measured thrust is the same as the target thrust. If not, the method reverts to block 208, where a new engine control parameter is set. The new engine control parameter is incremented from the previous value based on the difference between the target thrust and the determined thrust. Once the new engine control parameter is set, blocks 210, 212 and 214 are repeated.

If the determined thrust is equal to the target thrust at block 214, the method reverts to block 210, and blocks 210, 212 and 214 are repeated.

Environmental changes, and other changes, may cause a change in the thrust generated by the engine. Thus, the loop of continually monitoring the thrust, even when the target thrust is equal to the determined thrust, allows for an such variations to be accounted for, such that the thrust can be kept constant, when desired.

At any point during the operation of the engine The loop of the method 200 also allows for a new target thrust may be received, as illustrated at block 216. The new target thrust may be received in the same manner as the initial target thrust. When a new target thrust is received, a new engine control parameter is set, as in block 208, and the method 200 proceeds as before.

Therefore, when a target thrust is different to a determined thrust output, a control parameter of the engine 10 is changed based on the different between the target thrust, and the determined thrust. The new thrust is then determined using the engine performance parameter, and the process is repeated iteratively until the target thrust is achieved. The engine performance parameter is also used to then maintain the engine 10 at constant thrust.

Figure 9:
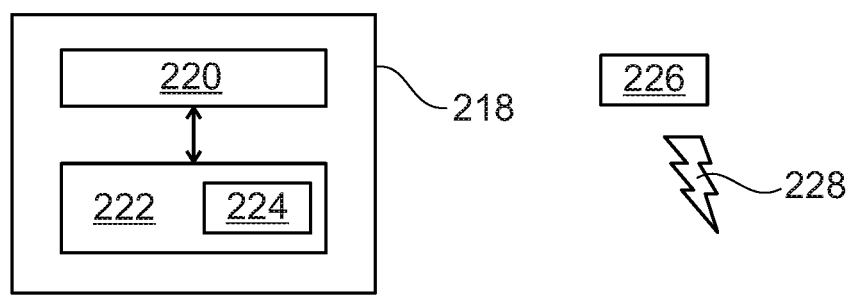
FIG. 9 schematically illustrates a flight controller for operating a gas turbine engine calibrated according to the method of FIG. 8.

At least steps 206 to 216 of the method discussed above may be controlled by a flight controller. The controller 68 discussed in relation to FIG. 5 may be the flight controller. Alternatively, a separate controller 218 may be used. FIG. 9 illustrates an example of a separate flight controller 218.

The flight controller 218 may comprise at least one processor 220 and at least one memory 222. The memory 222 stores a computer program 224 comprising computer readable instructions that, when read by the processor, causes performance of the method 200 to be performed.

The processor 220 70 may be located on the engine 10, or may be located elsewhere on the aircraft, remote from the engine 10, or may be distributed between the engine 10 and a location remote from the engine 10. The processor 220 may include at least one microprocessor and may comprise a single core processor, may comprise multiple processor cores (such as a dual core processor or a quad core processor), or may comprise a plurality of processors (at least one of which may comprise multiple processor cores).

The memory 222 may be located on the engine 10, or may be located elsewhere on the aircraft, remote from the engine 10, or may be distributed between the engine 10 and a location remote from the engine 10. The memory 22 may be any suitable non-transitory computer readable storage medium, data storage device or devices, and may comprise a hard disk and/or solid state memory (such as flash memory). The memory 22 may be permanent non-removable memory, or may be removable memory (such as a universal serial bus (USB) flash drive or a secure digital card). The memory 66 may include: local memory employed during actual execution of the computer program; bulk storage; and cache memories which provide temporary storage of at least some computer readable or computer usable program code to reduce the number of times code may be retrieved from bulk storage during execution of the code.

The computer program 224 may be stored on a non-transitory computer readable storage medium 226. The computer program 224 may be transferred from the non-transitory computer readable storage medium 226 to the memory 222. The non-transitory computer readable storage medium 226 may be, for example, a USB flash drive, a secure digital (SD) card, an optical disk (such as a compact disc (CD), a digital versatile disc (DVD) or a Blu-ray disc). In some examples, the computer program 224 may be transferred to the memory 222 via a signal 228 (such as a wireless signal or a wired signal).

Input/output devices may be coupled to the flight controller 218 either directly or through intervening input/output controllers. Various communication adaptors may also be coupled to the controller 218 to enable the controller 218 to become coupled to other apparatus or remote printers or storage devices through intervening private or public networks. Non-limiting examples include modems and network adaptors of such communication adaptors.

The methods 100, 100*a*, 100*b* of calibrating an engine core 11 discussed above are given by way of example only, and any suitable method may be used. Similarly, the system 50 and test apparatus 58 discussed above are given by way of example only.

Any suitable system can also be used to calibrate the engine core 11. For example, any suitable system can be used to measure the thrust generated by the engine core 11 during the calibration process, and any suitable sensor arrangement can be used to measure the engine performance parameter. Furthermore, any suitable controller may be used to control the method.

Figure 5C:
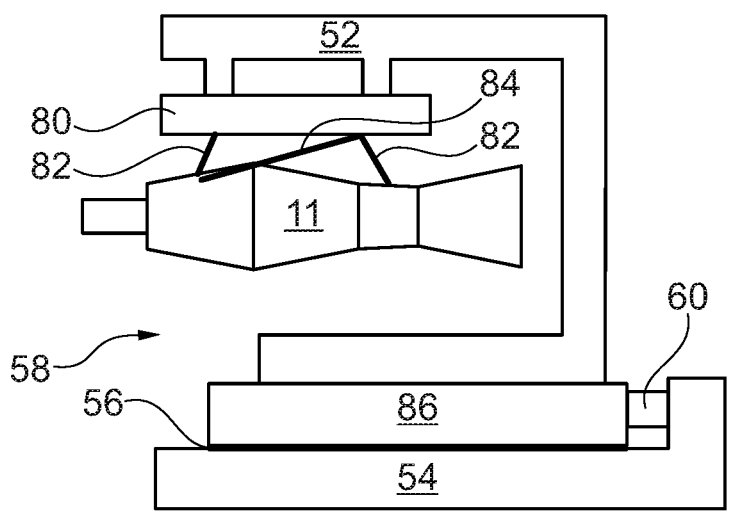
FIG. 5C illustrates an alternative test apparatus for mounting an engine core.

FIG. 5C illustrates one alternative example of a test apparatus 58 for measuring the thrust during the calibration process. The example shown in FIG. 5C is similar to the apparatus shown in FIG. 5A, unless stated otherwise.

In the example shown in FIG. 5A, the engine core 11 is suspended from above. However, in the example shown in FIG. 5C, the frame 52 is ground mounted. The frame 52 is rigidly secured to a frame slab 86. The frame slab 86 moves with the frame and provides a stable base for the frame 52. The frame slab 86 is mounted on the base 54, by the sliding interface 56. A retaining link 60, in the form of a load cell or strain gauge is provided between the frame slab 86 and the base 54, to measure the force exerted.

In the examples shown in FIGS. 5A and 5C, the retaining link 60 between the two parts of the frames is in the form of a strain gauge or load cell. This is by way of example. Any suitable retaining link 60 may be provided, and the relative force between the frame 52 and base 54 may be measured in any suitable way.

In the examples discussed above, various nominal engine control parameters are set, and the engine performance parameter and thrust measured at the given control parameters. In other examples, the engine control parameter may be iteratively varied to achieve pre-set values of thrust, and the engine performance parameter at those pre-set thrust values then measured. In further examples, the engine control parameter may be iteratively varied to achieve pre-set values of the engine performance parameter, and the thrust at those pre-set performance parameters measured.

In the examples discussed above, the load 62 is a generator (or block of generators 62), and the electricity provided by the generator(s) 62 is either provided to a battery 64, to a local network or external network, or is immediately used.

In other examples, the electricity can be used to heat water through a closed cycle system. This can be combined with a heat pump to store the energy generated in a large thermal mass, such as the ground. This may be particularly useful where the water heater is not dependent on a set electrical frequency, and so the energy can be stored, even when it is generated at varying electrical frequency.

In other examples, different kind of loads 62 may be used to provide mechanical resistance on the shaft 26. For example, a brake may be used. Where a brake is used, the braking force can be used to vary the resistance.

The steps in the methods of calibrating an engine core 100, 100a, 100b, and the method of operating an engine 200 may be performed in any suitable order. For example, in the methods of calibrating an engine core 100, 100a, 100b, the steps of measuring the engine performance parameter 106, and measuring the force 108 may occur simultaneously, or consecutively (in either order). Similarly, the power rating data may be output continuously throughout the method, or in stages, or only once the whole method is complete.

It will be appreciated that any suitable engine performance parameter that is indicative of the performance of the fan 23 may be used instead of the shaft rotational speed. For example where the engine 10 includes multiple shafts 26, 27, the engine performance parameter may be the rotational speed of any one of the shafts 26, 27. The engine parameter may also be an air pressure measured in the bypass duct 22 (at any point along the length of the duct 22), or a torque measurement on the fan 23.

It will be also appreciated that any suitable engine control parameter may be used. For example, the engine control parameter may be a variable geometric parameter of the engine, such as a variable vane position or a bleed valve flow. Furthermore, the engine 10 may be controlled by two or more parameters in combination, rather than a single parameter.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of calibrating an engine core of a gas turbine engine, the engine core comprising a turbine, combustion equipment, a compressor, and a core shaft connecting the turbine to the compressor, the core shaft being configured to drive a propulsive fan of the gas turbine engine, the method comprising:
   providing a resistance load on the core shaft, the resistance load being configured to replicate a load of the propulsive fan;
   driving the engine core;
   measuring a performance parameter of the engine core;
   measuring a thrust generated by the engine core; and
   determining power rating data of the engine core, which provides a correlation between the performance parameter and the thrust, so as to calibrate the engine core.

2. The method of claim 1, further comprising:
   operating one or more generators comprised by the resistance load to generate power whilst driving the engine core.

3. The method of claim 2, further comprising:
   storing the power generated by operating the one or more generators in a battery or other energy storage device.

4. The method of claim 1, wherein the resistance load or engine core comprises a gearbox that is configured such that the resistance load is driven at constant speed as a rotational speed of the core shaft is varied.

5. The method of claim 1, wherein the resistance load comprises a variable resistance load.

6. The method of claim 5, further comprising:
   varying the resistance of the resistance load to simulate different flight conditions;
   wherein the performance parameter and the thrust are measured at different loads, such that the power rating data provides the correlation between the performance parameter and the thrust for different loads.

7. The method of claim 1, wherein the performance parameter is selected from a list comprising: a torque on the shaft and a rotational speed of the shaft.

8. The method of claim 1, wherein:
   driving the engine core comprises driving the engine core at a first rotational speed; and
   the performance parameter and the thrust are measured at the first rotational speed.

9. The method of claim 1, wherein:
   driving engine core comprising driving the engine core at a plurality of rotational speeds; and the performance parameter and thrust are measured at different rotational speeds, such that the power rating data provides the thrust as a function of the performance parameter.

10. The method of claim 1, further comprising:
mounting the engine core on a test apparatus, the test apparatus comprising a frame for supporting the engine core, and a base for supporting the frame, the frame being coupled to the base by an interface arranged to allow relative displacement of the frame and base,
wherein measuring the thrust generated by the engine core comprises:
measuring a force exerted between the frame and the base; and
determining a thrust based on the force.

11. The method of claim 1, wherein the method calibrates an engine core only, without a propulsive fan or fan case attached to the engine core.

12. A method of operating a gas turbine engine the gas turbine engine comprising the engine core calibrated according to the method of claim 1, the method of operating the gas turbine engine comprising:
combining the calibrated engine core with a fan and fan case;
setting an engine control parameter;
measuring a thrust generated by the engine based on the power rating data and a measured engine performance parameter;
determining if the measured thrust is equal to a target thrust; and
controlling the engine control parameter based on the determining.

13. A calibration system configured to calibrate an engine core of a gas turbine engine, the engine core comprising a turbine, combustion equipment, a compressor, and a core shaft connecting the turbine to the compressor, the core shaft being configured to drive a propulsive fan of the gas turbine engine, the system comprising:
a frame for mounting the engine core;
a base for supporting the frame, the frame being coupled to the base by an interface arranged to allow relative displacement of the frame and base;
a sensor arrangement configured to measure a force exerted between the frame and the base; and
a resistance load configured to be coupled to the core shaft of the engine, the resistance load being configured to replicate a load of the propulsive fan.

14. The calibration system of claim 13, further comprising a second sensor arrangement configured to measure a performance parameter of the engine core.

15. The calibration system of claim 14, wherein the second sensor arrangement is comprised within the engine core.

16. The calibration system of claim 13, wherein the resistance load comprises one or more generators configured to generate power.

17. The calibration system of claim 16, comprising:
a storage device configured to store the power generated by the one or more generators.

18. The calibration system of claim 17, wherein the resistance load or engine core comprises a gearbox that is configured such that the resistance load is driven at constant speed as the rotational speed of the core shaft is varied.

19. The calibration system of claim 13, wherein the resistance load comprises a variable resistance load.

20. The calibration system of claim 13, wherein the system is configured to calibrate the engine core without the propulsive fan or a fan case attached to the engine core.

* * * * *